Aug. 29, 1933.   F. C. KUSSE   1,924,192
AIRCRAFT
Filed Oct. 13, 1930   3 Sheets-Sheet 3
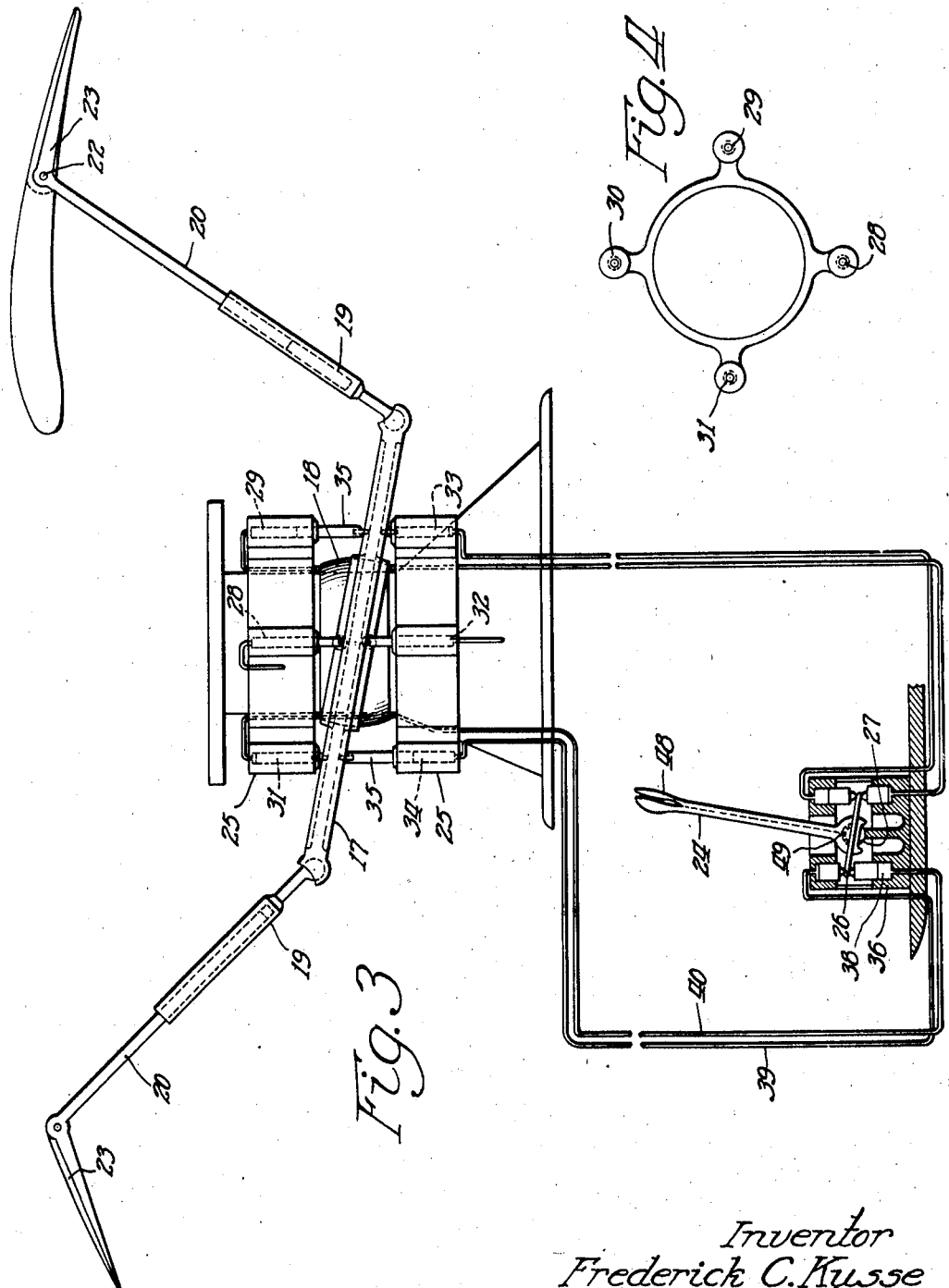
Inventor
Frederick C. Kusse Patented Aug. 29, 1933

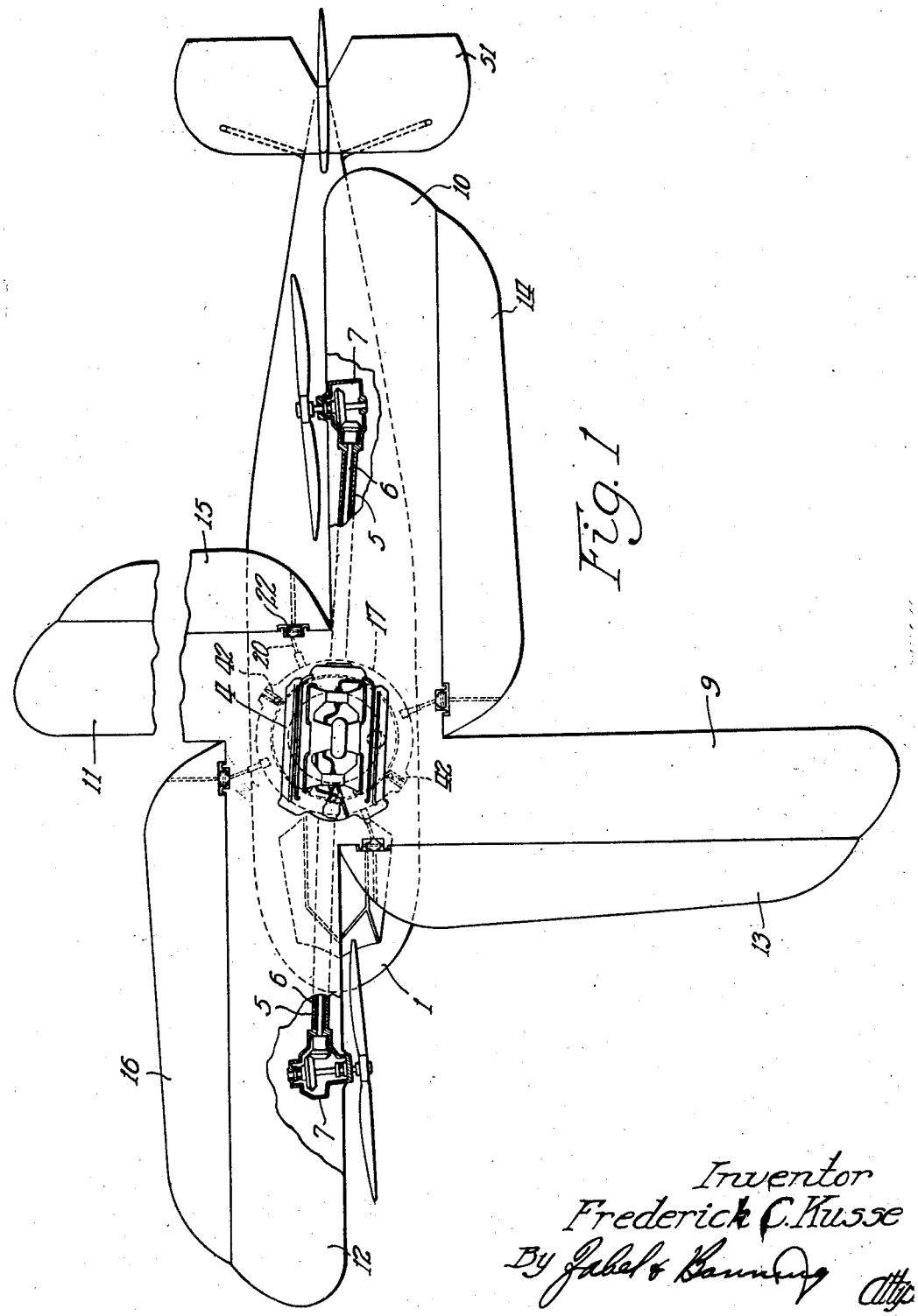

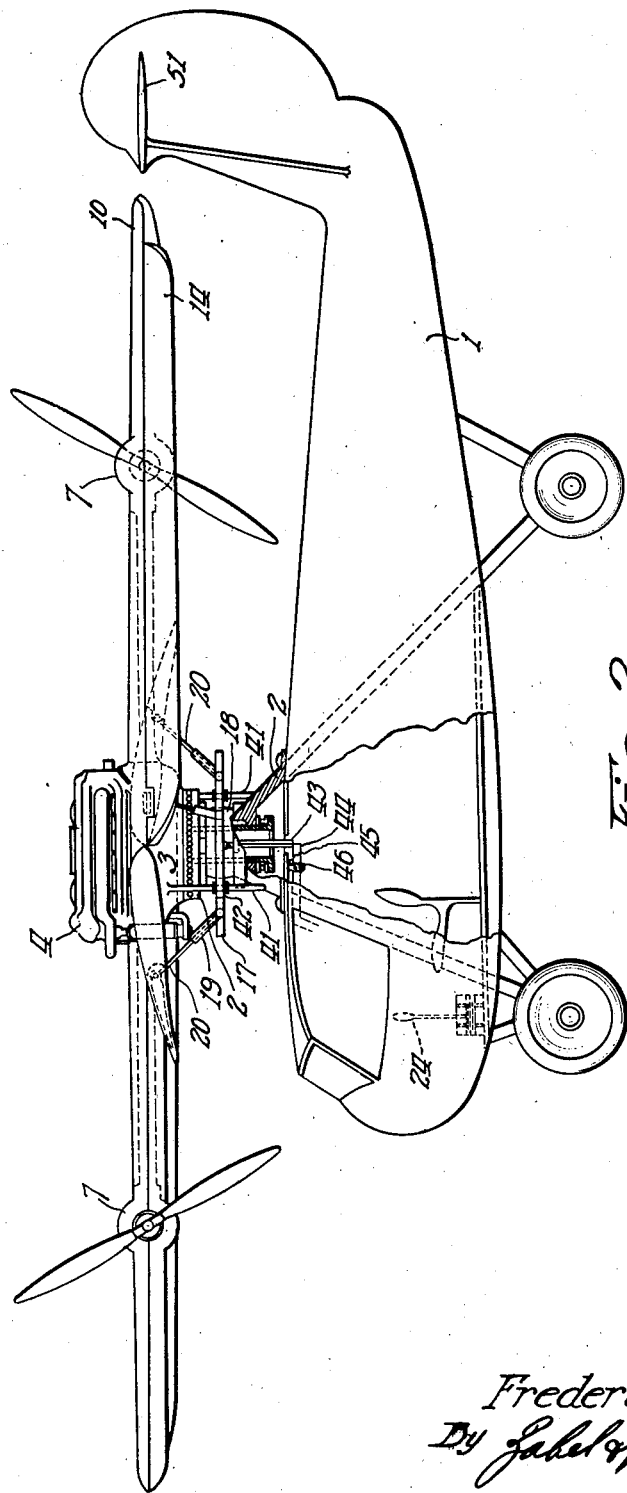

1,924,192

UNITED STATES PATENT OFFICE 1,924,192

AIRCRAFT

Frederick C. Kusse, Chicago, Ill.

Application October 13, 1930. Serial No. 488,309

8 Claims. (Cl. 244—19)

My invention relates to aircraft and more particularly to heavier than air machines of the general type employing a lifting airscrew or windmill as a means of obtaining the lift necessary to cause the craft to rise.

The general type of machine under discussion is disclosed for instance in Patent No. 1,653,185, granted in 1927.

This invention is concerned with the problem of obtaining horizontal flight in this type of aircraft and has for its principal object a novel method and means of producing horizontal flight without the use of any additional propelling means, which flight may also be readily controlled as to direction.

It is furthermore a purpose of this invention to provide a mechanism of this character wherein the speed of travel need not entirely depend upon the driving speed of the power unit maintaining the aircraft above the ground.

My invention also contemplates the provision in a device of this character of a simplified control which permits the control of direction by a single adjustment of an operating lever.

The aircraft under consideration and to which my invention applies consists essentially of the conventional fuselage, landing gear, and tail surfaces of an airplane, but in place of wings it is equipped with a large lifting airscrew caused to rotate by means of propellers carried by the wings of the airscrew. These propellers are driven through gearing by a power unit which may be conveniently situated at the hub of the windmill or within the body of the aircraft.

Briefly described, the method of obtaining horizontal flight with this type of aircraft which forms the subject matter of this invention is an application of the principle involved in what is known as sideslipping of an airplane. By providing the windmill or airscrew with some suitable variable lift airfoil arrangement, such for example as hinged flaps or ailerons which can be automatically operated by a control unit situated at the hub of the aircraft, a lateral slipping of the windmill can be brought about which, when caused to occur in the proper direction, will cause forward motion of the aircraft.

I will describe one form which my invention may take by reference to the accompanying drawings wherein—

Fig. 1 is a top plan view partly in section of the aircraft;

Fig. 2 is a side view partly in section of the completed device;

Fig. 3 is an enlarged view of the aileron adjusting mechanism; and

Fig. 4 is a detailed view illustrating part of the hydraulic control.

Referring now in detail to the drawings, the fuselage is indicated by the numeral 1 and has a suitable pedestal 2 fastened to the top thereof on which the windmill and motor unit are rotatably mounted. A support 3 is interposed between the motor and pedestal 2 to which the motor and cantilever wings are rigidly fastened to form with the support 3 one rigid unit rotatably mounted in the pedestal 2. The numeral 4 indicates the motor or engine which may be of any suitable construction. The numeral 5 indicates a plurality of hollow arms or extensions of the crank case of the engine 4. These hollow arms lend strength to the wing structure and support the drive shafts 6 which are extensions of the crank shaft of the engine. The drive shafts 6 extend into gear boxes 7 containing bevelled gears of the proper angle and position for driving the propellers and bringing them in such a position that the plane of rotation of the propellers includes the axis of rotation of the windmill as described in our prior patent.

It will be observed that the gear boxes and arrangement of gears are not exactly duplicates. The arrangement shown permits the use of propellers rotating in the same direction as they advance instead of one right and one left propeller as exactly similar gear boxes would require.

The wings of the windmill are indicated by the numerals 9, 10, 11, and 12, and they have hinged thereto the wing flaps or ailerons 13, 14, 15, and 16. The control means for the ailerons consist of a control disk 17 which combines with a supporting unit 18 fitted over pedestal 2 whose outer surface is a section of a sphere the center of which lies on a vertical axis of the pedestal. The disk 17 and the unit 18 form what might be termed a ball and socket joint which permits disk 17 to be rotated about the axis of pedestal 2 and also permits its adjustment or free movement about any horizontal axis intersecting the center of the sphere whose surface forms the surface of the unit 18. The aileron control levers are indicated at 19 and 20, the means 19 being in the form of sleeves receiving the rods 20 so that the levers may be adjustable in length. The sleeves 19 are preferably connected by ball and socket joints or other suitable universal joints to disk 17 while the rods are pivoted on the wings as indicate at 22 and are fixed with respect to the aileron structure as shown at 23.

From an inspection of Fig. 3, it is believed to be clear that, if for example the position of ring 17 with respect to a plane parallel to the top of the pedestal 2 be changed, the angle of the aileron with respect to the wings will also be changed.

The means of controlling the position of disk 17 consists of a hydraulic system operated by a control stick 24. This control stick is fastened to a disk 26 which contains a socket fitted over a ball 27 permitting disk 26 to be tilted on any horizontal axis passing through the center of sphere 27. The numeral 25 indicates a pair of cylinder carrying units mounted on pedestal 2 above and below the ring 18. The units 25 both upper and lower are fitted with four cylinders each such as 28, 29, 30, 31, 32, 33, 34, and 34a. These cylinders are arranged in diametrically opposed pairs and contain the plungers indicated by the numeral 35. The numeral 36 indicates a second hydraulic unit which is geometrically arranged similar to the unit on the pedestal 2 made up of the upper and lower units 25 in their respective cylinders and plungers. The cylinders of unit 36 are connected by tubing to the cylinders of units 25, the lower cylinders of 25 being connected to the corresponding upper cylinders of 36, and the upper cylinders of 25 being connected to the corresponding lower cylinder of 36.

The arrangement permits the control of disk 17 is in the following manner:

Looking at Fig. 3 when the control strick 24 is moved back to force its rear plunger down and forces the front plunger up, considering the forward direction to be to the left when looking at this figure, this forces the liquid contained in tube 39 upward into the chamber 34 thus moving the plunger 35 upward and causing disk 17 to tilt on a horizontal axis parallel to the axis of tilt of the disk 26. At the same time, plunger 31 is moved upward causing the liquid in tube 40 to enter the lower chamber 38 of the unit 36. The plungers all operate in this fashion so that for any movement of the control stick 24 whether it be lateral or longitudinal or a combination of these two the disk 26 will operate the hydraulic system in such a way that plungers in units 25 will cause disk 17 to tilt on an axis parallel to the axis of tilt of disk 26.

When the control stick 24 is in neutral position as shown in Fig. 2, disk 17 is in a plane parallel to the plane of rotation of the windmill. This is the vertical rising or hovering position. When power is applied, the propellers cause the windmill to rotate, and disk 17 rotates in unison with the windmill by means of the drive rods 41. These rods are rigidly connected to the windmill structure and lie parallel to the axis of the windmill fitting in the radial slots 42 of disk 17 for all positions of this disk. Preferably the drive rods fit into sleeves which are connected by universal joints to units which slide in the slots 42. This mechanism, however, is a matter of mechanical detail and has not been shown specifically as it is believed to be unnecessary for the general understanding of the invention.

The feature desired is an arrangement which permits the drive rods to maintain driving contact with disk 17 for all positions of this disk with respect to the windmill and cause it to therefore rotate with the windmill. Since in the horizontal position of ring 17 the ailerons maintain their neutral position, the center of lift will correspond to the geometrical center of the windmill, and the aircraft will rise or tend to rise vertically, the question of whether it will rise or not depending upon the relation of the lift exerted to the weight which must be lifted.

Now if the control stick is moved in any direction whatever from the neutral position, this operates to move disk 17 by means of the hydraulic system into a plane which is not parallel to the plane of rotation of the windmill. With the disk 17 in this new position, the raised side thereof will be a shorter distance from the ailerons than the depressed side thereof. Consequently the aileron control levers 19 and 20 must continuously adjust themselves to the various distances as the windmill rotates, and with it disk 17 rotates, the connections, of course, of the control lever to the disk 17 being maintained at all time by the universal joints. The vertical movement of the control levers due to this action causes the angular setting of the ailerons to vary over a continuous series of values for each revolution of the windmill. The change in angular settings through which the ailerons are moved for each revolution or cycle depends upon the leverage system and upon the magnitude of the angle of change made of control disk 17 from neutral position. However, regardless of the values of the angular movement of the ailerons, the general nature of the movement is the same for any setting of control disk 17.

When the aileron control lever is at the extreme raised position of control disk 17, it causes a maximum depression of an aileron controlled thereby thus causing this aileron to exert its maximum lift. During the following 90° of rotation of the windmill, this same aileron moves up and reaches neutral position at the end of the 90° turn. During the next quarter turn, the aileron moves from its neutral position to that of maximum raised position, and, as a result thereof, the minimum lift exerting position. During the next quarter turn, this same aileron moves again to neutral position, and, at the end of the fourth quarter, it has moved down to maximum depression again.

Since the control rods are connected 90° apart to control disk 17, the individual ailerons will be continuously operating in phases or cycles which are 90° apart in the sequence just mentioned. That is, an aileron of maximum depression will be diametrically opposite one of maximum raised position, and the neutral aileron will be diametrically opposite another neutral aileron. Also, for a certain setting of disk 17, the position of maximum depression is maintained for all ailerons at the same position relative to the aircraft body.

Practical demonstration has shown that by proper setting of control disk 17 so as to bring the position of maximum depression of the ailerons to a definite position relative to the longitudinal axis of the fuselage, continuous forward flight may be obtained. Furthermore, if the center of pressure be shifted to the right relative to the fuselage, the aircraft will circle to the left; similarly, if the center of pressure be shifted to the left of that corresponding to the forward flight, the aircraft will circle to the right. In this way, the wings which provide the lift of the aircraft are caused to vary, by means of a control unit, their lift coefficient in synchronism with the rotation of the windmill thereby producing a lateral slippage which, if adjusted to the right position, will cause forward motion of the aircraft. The speed of the forward motion will, of course, depend upon the change in lift coefficient of the wings.

The diving moment due to the variation of attitude of the wings in rotation is offset automatically by virtue of conditions quite similar to those of an airplane held in side-slip. The wings being set at a certain amount of dihedral angle are caused to meet the air at various angles to the leading edge in following their cycloidal paths in rectilinear flight. Since the true angle of attack of an airfoil is measured in the plane of the flow of air particles, then in the forward motion of the aircraft a wing in front of the hub will, because of the dihedral angle, be acting at a more effective angle than if the flow were normal to the leading edge. Likewise, a wing to the rear of the hub will be moving over a section of the cycloidal path such that it will be acting at a less effective angle than if the air flow were normal to the leading edge. Thus a countering pitching moment is developed in rectilinear flight with the elevator neutral which just balances and off-sets the diving moment associated with the forward slippage and which is due to the variation of attitude of the wings in rotation.

The hydraulic control system as shown contains a means for locking the system in position for continuous flight horizontally. The sphere 27 is preferably provided with many small holes drilled into its surface. When stick 24 is brought to the position corresponding to the desired speed of forward flight, lever 48 may be released thus permitting plunger 49 to enter one of the holes in sphere 27 and thereby lock the system.

Although a movable rudder and elevator operate on this aircraft substantially as in the case of the airplane, the proper shifting of control disk 17 is all that is necessary for accomplishing the various maneuvers required in handling the plane. It will be observed from the diagrams that the horizontal stabilizer 51 is shown in an elevated position somewhat higher than in the conventional airplane and substantially in the plane of rotation of the windmill. This position has been found to be the most favorable one for dynamic stability for this type of aircraft.

For controlling the motor, I provide a sleeve 43 which forms part of a leverage system controlling the throttle. Sleeve 43 is not rotatable, but, by pivoting its connecting lever at 45, it can be raised or lowered and thus operate a lever on the other side of the engine which lever is connected by a rotatable unit to the upper end of sleeve 43 and preferably pivoted to the engine. I have shown also a lever 44 for controlling the spark advance lever of the magneto. This lever is not rotatable, but may be moved in a vertical direction by pivoting on the member 46. It passes up through tube 43 and is entirely independent of the tube leverage system. Its upper end connects by a ball and socket joint to a lever on the under side of the engine.

Since the engine is mounted horizontally, the engine reaction or torque results in a twisting moment tending to rotate the windmill on the crankshaft axis in the direction opposite to that in which the crank shaft turns. It is proposed to overcome this reaction aerodynamically as is done in the conventional airplane. This can be accomplished by properly rigging the windmill. If the direction of rotation of the crankshaft is such that the engine torque tends to depress wing 9 and raise wing 11, then, by rigging wing 9 at a sufficiently greater angle than that of wing 11 to produce the required countering moment, the reaction may be offset.

From the above description, it is believed that the construction and operation of this device will be clear to those skilled in the art and the advantages thereof readily apparent.

Having thus described my invention, what I claim as new and desire to secure by Letters Patent is:

1. An aileron control unit or variable lift airfoil control unit situated at the hub of a vertically rising aircraft and consisting of a ring having a spherical surface upon which is mounted the control disk or ring and to the outer edge of which disk or ring aileron control sleeves are connected by ball and socket joints, said sleeves containing rods which regulate the angle setting of the ailerons or variable lift airfoils during rotation of the lifting unit.

2. A hydraulic control system having a series of plunges and cylinders for controlling a variable lift airfoil control unit, a control stick having a socket fitting over a ball, a disk fitted rigidly to the socket and arranged in such relative position among the plungers of said hydraulic system as to cause the disk to operate the plungers to transmit the forces due to the shifting of the control stick to the liquid of the hydraulic system and on to the aileron control unit where the pressures are exerted against other plungers which cause the shifting of position of the control ring or disk.

3. A vertically rising aircraft having an airscrew provided with variable lift wings, a pedestal on said aircraft for said screw having a spherical exterior surface, and a control ring for varying the lift of said wings universally mounted on the spherical surface of said pedestal.

4. An aircraft having a lifting airscrew provided with variable lift wings and a tiltable lift control unit universally mounted about a point on the axis of rotation of said airscrew for varying the lift of said wings, and means for tilting said unit comprising a master unit universally mounted about a fixed point in the fuselage of said aircraft and hydraulic transmission means connecting said units whereby tilting of the master unit causes a corresponding tilting of the lift control unit.

5. The combination in aircraft of a fuselage, an airscrew above said fuselage having variable lift wings, a pedestal on said fuselage upon which said airscrew is mounted, said pedestal having an exterior spherical guide surface, a control device for said wings mounted on said pedestal, said device including a control ring guided by said surface, means interconnecting said airscrew and control ring to cause them to rotate together, and means for changing the angular setting of said ring on said surface while the ring is rotating.

6. The combination in aircraft of a fuselage, a windmill above said fuselage forming the lifting unit for the aircraft, said fuselage having a pedestal upon which said unit is mounted, and control means for the windmill mounted on said pedestal, said control means having connection with the wings of the windmill to vary the lift thereof, a universally mounted control lever within the fuselage, and hydraulic transmission means between said lever and said control means whereby movement of said lever causes a corresponding movement of said control means.

7. The combination in aircraft of a fuselage, an airscrew above said fuselage having variable lift wings, a pedestal on said fuselage upon which said airscrew is mounted, said pedestal having an exterior spherical guide surface, a control device for said wings mounted on said pedestal, said device including a control ring guided by said surface, means interconnecting said airscrew and control ring to cause them to rotate together, and means for changing the angular setting of said ring on said surface while the ring is rotating, said last named means comprising a hydraulic unit on said pedestal having a plurality of fluid pressure responsive members arranged about said pedestal for moving said ring, and a similar hydraulic unit within the fuselage having fluid connections with the pedestal unit to actuate said members.

8. An aircraft having a lifting screw provided with variable lift wings and a tiltable lift control unit universally mounted about a spherical surface on the axis of rotation of the airscrew for varying the lift of the wings together with a master unit in the fuselage of the aircraft geometrically similar to the first named unit, said fuselage having a spherical surface upon which the master unit is mounted, and means interconnecting the first unit with the second to transmit the tilting of the master unit to the lift control unit.

FREDERICK C. KUSSE.